MARINE PROPULSION DEVICE WITH ACUTE ANGLE DRIVE

Original Filed July 24, 1969 2 Sheets-Sheet 1

INVENTOR
WILLIAM J. SHIMANCKAS

BY Wheeler, Wheeler, House & Clemency
ATTORNEYS

MARINE PROPULSION DEVICE WITH ACUTE ANGLE DRIVE

Original Filed July 24, 1969 2 Sheets-Sheet 2

INVENTOR
WILLIAM J. SHIMANCKAS
BY Wheeler, Wheeler, Hauer & Clemens
ATTORNEY

United States Patent Office

Re. 28,209
Reissued Oct. 22, 1974

28,209

MARINE PROPULSION DEVICE WITH ACUTE ANGLE DRIVE

William J. Shimanckas, Waukegan, Ill., assignor to Outboard Marine Corporation, Waukegan, Ill.

Original No. 3,605,678, dated Sept. 20, 1971, Ser. No. 844,457, July 24, 1969. Application for reissue Sept. 5, 1972, Ser. No. 286,148
Int. Cl. B63h *5/12*
U.S. Cl. 115—35 7 Claims

Matter enclosed in heavy brackets [ ] appears in the original patent but forms no part of this reissue specification; matter printed in italics indicates the additions made by reissue.

ABSTRACT OF THE DISCLOSURE

Disclosed herein is a marine propulsion device which includes a drive shaft housing having upper and lower housing sections. The upper drive shaft housing is rotatably supported aft of the boat transom by a pair of opposed laterally extending trunnions which are supported on the boat hull and which extend into coaxial apertures in the upper end of the drive shaft housing to provide a horizontal tilt axis. The drive shaft housing includes a drive shaft and a propeller shaft which form an acute angle measured on the aftward side of the drive shaft and the upper side of the axis of the propeller shaft. Means are provided for selectively tilting the drive shaft housing about the horizontal tilt axis relative to a normal operating position with the drive shaft extending downwardly and forwardly and with the propeller shaft being generally horizontal. Steering is afforded by rotating the lower housing section about the drive shaft axis. The interior of the lower housing section is in communication with the interior of the upper housing section to afford underwater discharge of exhaust through a passage in the propeller hub.

BACKGROUND OF THE INVENTION

The invention relates to marine propulsion devices and more particularly to propulsion devices of the inboard-outboard type which are commonly called stern drives and of the type disclosed in my copending United States application Ser. No. 811,829, *now patent No. 3,583,357.*

SUMMARY OF THE INVENTION

The invention provides a marine propulsion device in which steering of the marine propulsion device causes the bow of the boat hull to rise when making a turn rather than to dig into the water. In this regard, the invention includes a drive shaft housing rotatably supported aft of the boat transom for tilting movement about a horizontal tilt axis by opposed trunnions which are received in coaxial apertures in the upper end of the drive shaft housing. In the normal operating or running position, the drive shaft and drive shaft housing are inclined downwardly and forwardly with respect to the horizontal tilt axis, and the propeller shaft is in a generally horizontal position.

Steering of the marine propulsion device at all angles of tilt is afforded by rotating a lower housing section about the axis of the drive shaft. In this regard, the lower housing section has a projecting portion which extends into and is rotatably supported in an upper housing section. Rotation of the lower housing section when the drive shaft housing is in the normal operating position with the steering axis inclined forwardly and the propeller shaft at a horizontal position causes the aftward or rearward end of the propeller shaft to swing upwardly at an angle with the horizontal to produce an upwardly inclined propeller thrust which causes a downward force to move the stern of the boat downward, thus raising the bow and preventing the bow from digging into the water on turns.

The forwardly inclined drive shaft housing also locates the propeller close to the boat hull to thus minimize cavitation about the propeller, and to provide protection for the lower unit. In addition the forwardly inclined drive shaft housing results in a shorter overall length for the boat and marine propulsion device, thereby facilitating storage and docking.

The invention also provides a drive shaft housing in which the interiors of the upper and lower housing sections are in communication to provide a passage for conveying exhaust gases to a propeller hub provided with an exhaust discharge passage.

The marine propulsion device includes a housing which extends through an aperture or opening in the transom. The housing rotatably supports a first shaft forwardly of the transom and a second shaft rearwardly of the transom and in coaxial relation with the horizontal tilt axis provided by the opposed trunnions which are part of the housing. The first shaft rotatably supports a pair of bevel gears which are in mesh with the bevel gear on the engine output shaft. An axially shiftable clutch dog splined to the first shaft is selectively engageable with either of the bevel gears on the first shaft to change the direction of rotation of the first shaft to afford forward and reverse propeller rotation. The first shaft is connected to the second shaft by a belt or chain and sprockets. To facilitate mounting of the propulsion device and to accommodate various transom angles on different boat hulls, the invention provides means for tilting the housing about the first shaft. The means includes a bracket having a series of apertures and a tilt pin which can be selectively positioned in any of the apertures to vary the angle of the housing.

It is a [further] object of the invention to provide a marine propulsion device in which the device shaft housing is supported for tilting or vertical movement about a horizontal tilt axis located aft of the boat hull and in which the drive shaft housing can be selectively tilted from a normal operating position in which the drive shaft housing extends downwardly and forwardly to locate the propeller and drive shaft housing close to the transom to a retracted position in which the drive shaft housing extends downwardly and [rearwardly] *rearwardly* of the horizontal tilt axis.

It is a further object of the invention to provide a marine propulsion unit which steers about a forwardly inclined drive shaft axis in the normal operating position to provide an upwardly inclined propeller thrust and thus a downward force on turns to raise the bow of a boat hull.

It is an additional object of the invention to provide a marine propulsion device which includes a drive shaft housing having upper and lower housing sections and in which the drive shaft housing is rotatably supported about a horizontal tilt axis located aft of the boat transom and in which the lower housing section is steerable about the drive shaft axis to steer the boat.

Further objects and advantages of the invention will become apparent from the following description and accompanying drawings.

DRAWINGS

DETAILED DESCRIPTION

Figures 1, 2:
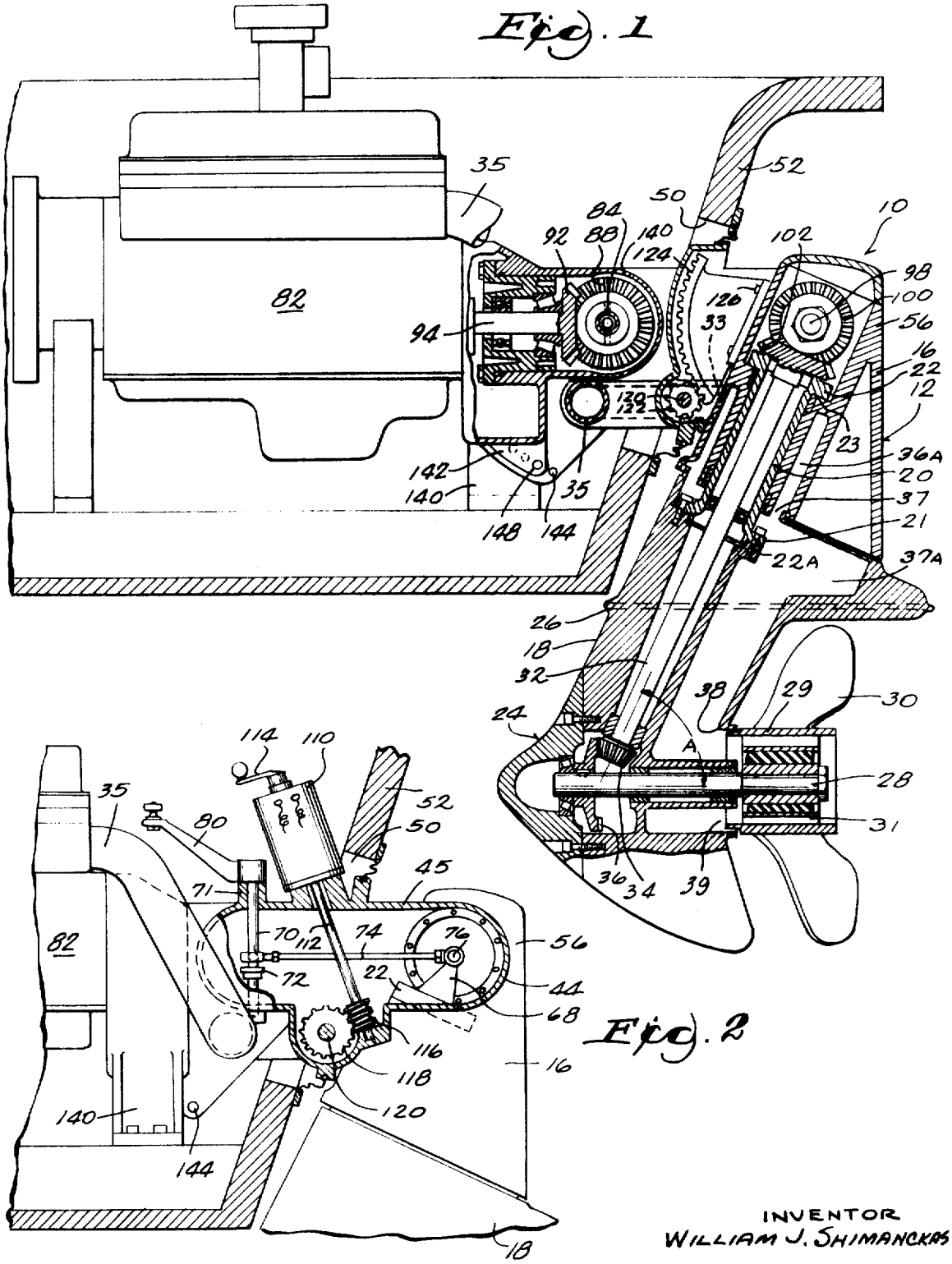
FIG. 1 is a side elevational view, in fragmentary section and with portions removed, of a marine propulsion device in accordance with the invention.
FIG. 2 is a fragmentary sectional view of the marine propulsion device shown in FIG. 1.

Referring to the drawings, FIG. 1 discloses a marine propulsion device which is generally designated 10 and which includes an outboard leg or drive shaft housing 12 having upper and lower housing parts or sections 16 and 18, respectively. To afford steering of the lower housing section 18 as hereinafter described in detail, the lower housing section 18 has a projecting portion 20 with a lower outturned flange 21 which is secured by bolts 22A to the lower housing section 18. The projecting portion 20 extends through the upper housing section 16 and is provided with an upper outturned annular flange 22 which engages a shoulder 23 in the housing section 16 to rotatably connect the lower housing section 18 to the upper housing section 16. Alternatively, the upper end of the projecting portion 20 can be secured to the upper housing section 16 and the lower end can be rotatably connected to the lower housing section 18.

The lower housing section 18 also includes a gear case 24 which is fixedly connected to the lower housing section 18 along the surface 26. A propeller shaft 28 is rotatably supported within the interior of the gear case 24 and carries a propeller 30. The propeller 30 has a hub 29 with an axial passage 31 to afford underwater discharge of exhaust gases.

To convey the exhaust gases from the engine to the propeller, the upper drive shaft housing 16 is provided with an exhaust inlet 33 which can be connected to the engine exhaust pipe 35 by a flexible tube (not shown). The interiors of the upper and lower housing sections 14 and 16 are provided with exhaust passages 36A and 37A which communicate through an opening 37. The lower housing section 16 or gear case 24 is provided with an annular wall portion 38 which defines a rearwardly open exhaust outlet 39 which communicates with passage 31 in the hub 29. Thus the engine exhaust enters inlet 33, travels through passage 36A through opening 37 and passage 37A and through the outlet 39 and passage 31 in the hub 29.

In accordance with the invention, and to raise the bow of the boat hull on turns, a drive shaft 32 is rotatably supported in the drive shaft housing 12 to form an acute angle A with the propeller shaft 28. The angle A is rearwardly open with the apex of the angle pointing forwardly. The acute angle A is also measured between the aftward side of the axis of the drive shaft and the upper side or above the axis of the propeller shaft. The drive shaft 32 is connected to the propeller shaft by gears 34 and 36.

Means are provided for rotatably supporting the drive shaft housing 12 for vertical tilting movement about a horizontal tilt axis. As disclosed, the means comprises a pair of opposed trunnions 40 and 42 (FIG. 3) supported in spaced housing portions 43 and 44 (FIG. 4) of a tiltable housing 45. The housing portions 43 and 44 (FIGS. 3 and 4) are in the form of inwardly open panels which extend through an aperture 50 in the transom 52. The housing portions 43 and 44 are spaced by a gap 54 (FIG. 4) to receive the upper end 56 of the upper housing section 16. The upper end 56 of the upper housing section is provided with a pair of spaced concentric apertures 60 and 62. The trunnions 40 and 42 extend into the apertures 60 and 62 to support the drive shaft housing 12 and provide a horizontal tilt axis.

The horizontal tilt axis is spaced aftward of the transom a distance sufficient to permit the drive shaft housing 12 to extend downwardly and forwardly beneath the transom and to afford a normal operating or running position in which the propeller shaft is generally horizontal.

Figure 3:
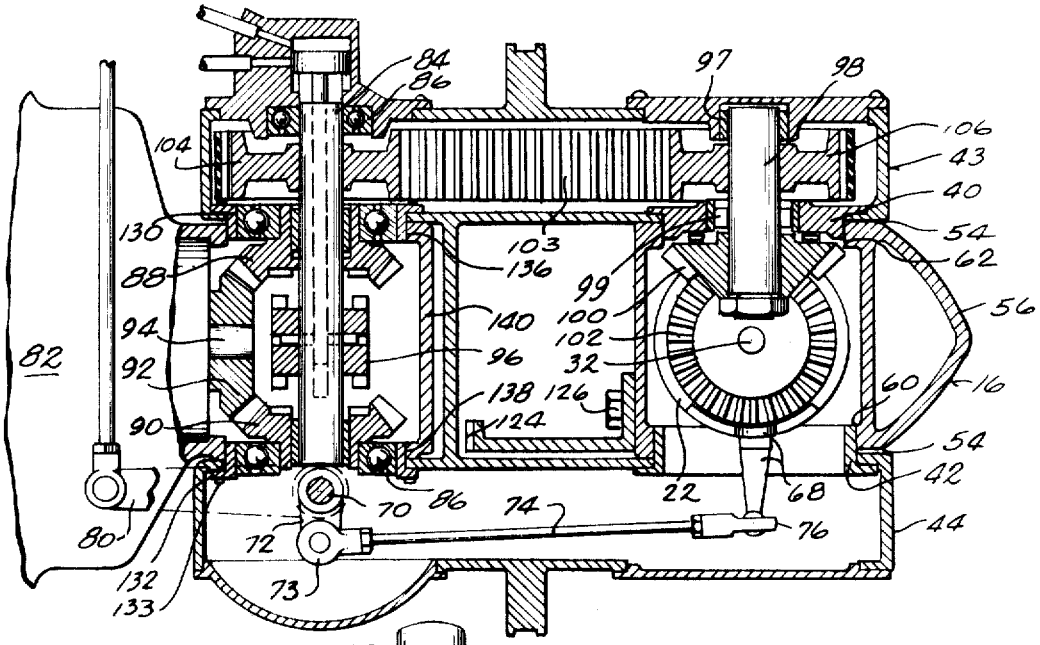
FIG. 3 is an enlarged fragmentary plan view of the marine propulsion device shown in FIG. 1.
Figure 4:
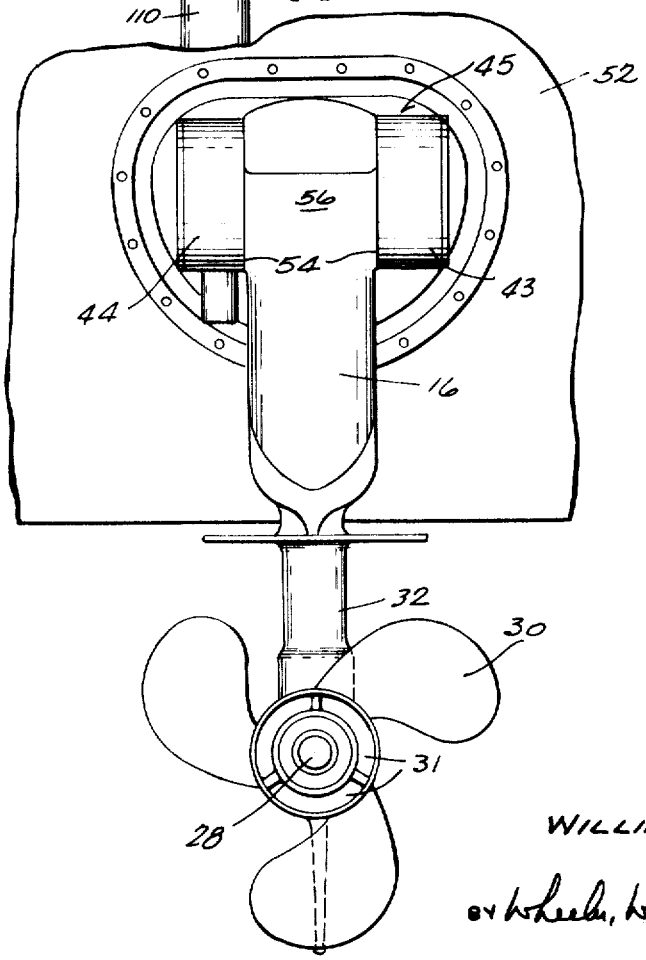
FIG. 4 is a rear view of the marine propulsion device shown in FIG. 1.

In accordance with the invention, means are provided for rotating a portion or part of the drive shaft housing or lower housing section 16 to afford steering of a boat hull. As disclosed, the means includes a transversely extending post or arm 68 (FIG. 3) which is connected to the upper end of the projecting portion 20. The means includes also a steering shaft 70 (FIGS. 2 and 3). The steering shaft is supported in a bearing 71 (FIG. 2) on the tiltable housing 45 and secured to an arm 72. A ball and socket coupling 73 connects the arm 72 to a link 74. The link 74 can be connected to an arm 68 by a ball and socket coupling 76. To facilitate connection of the steering shaft 70 to a conventional remote steering apparatus, the shaft 70 is provided with a steering arm 80 (FIG. 2).

Means are provided for drivingly connecting the engine 82 to the drive shaft 32. As disclosed, the means includes a first horizontal cross shaft 84 (FIG. 3) which is rotatably supported in housing portions 43 and 44 by bearings 86. The first horizontal cross shaft 84 can also form part of a means for reversing the direction of rotation of the propeller. In this regard, a pair of bevel gears 88 and 90 are rotatably supported on the cross shaft 84 and are in mesh with a gear 92 secured to an engine output shaft 94. An axially shiftable clutch dog 96 is splined to cross shaft 84 and is selectively engageable with either bevel gear 90 or bevel gear 88. The clutch dog 96 can be shifted by hydraulic, pneumatic or electrical means as disclosed in my United States Pat. application Ser. No. 809,465, *now Pat. No. 3,623,583*.

The means for connecting the engine to the drive shaft also includes a second cross shaft or stub shaft 98 (FIG. 3) which is rotatably supported by bearings 97 and 99 in housing 43 in coaxial relation with the horizontal tilt axis of the drive shaft housing and which extends through the trunnion 40. The second shaft 98 is provided with a bevel gear 100 which engages a bevel gear 102 secured to the upper end of the drive shaft 32. Inasmuch as the axis of shaft 98 is coincidental or coaxial with the horizontal tilt axis, the gears 100 and 102 remain in mesh during tilting of the drive shaft housing 12 about the horizontal tilt axis to provide continuous transfer of power at all angles of tilt. The first shaft 84 can be connected to the second shaft by various arrangements. As disclosed, the first shaft 84 is connected to the second shaft 94 by a belt 103 reeved on a pulley 104 connected to shaft 84 and reeved on a pulley 106 connected to shaft 98.

Means are provided to selectively vary the angle of tilt of drive shaft housing 12 about the horizontal tilt axis relative to a normal operating or running position in which the drive shaft housing 12 extends downwardly and forwardly of the horizontal tilt axis, and in which the propeller shaft 28 is generally horizontal. The means can include various of the features disclosed in my United States Pat. No. 3,183,880 and includes an electric motor 110 (FIG. 2) which has an output shaft 112. The upper end of the output shaft 112 can be provided with a hand crank 114 for manual tilting. The other end of the output shaft is provided with a worm gear 116 in mesh with a worm wheel 118 secured to a stub shaft 120. The stub shaft 120 is provided with a gear 122 which, as shown in FIG. 1, meshes with a gear sector 124 secured to the upper housing section 16 by bolts 126 (FIGS. 1 and 3).

To facilitate mounting of the marine propulsion device 10 and to adjust the trim of a boat hull, the invention also provides means for rotatably supporting the tiltable housing 45 for movement about the first cross shaft 84. As disclosed in FIG. 3, the means includes inturned flanges or trunnions 130 and 132 which are respectively secured to spaced housing portions 43 and 44 by bolts 133. The flanges 130 and 132 are received in spaced coaxial apertures 136 and 138 in an engine supporting member 140 (FIGS. 2 and 6) which is secured to the boat hull. The invention also includes means for selectively varying the angle of tilt of the tiltable housing 45 about the axis of the first shaft 84. As disclosed, the means includes a bracket 142 (FIG. 1) which is secured to the tiltable housing 45 and which is provided with a series of spaced apertures 144. The engine supporting member 140 is provided with an aperture 148. The tiltable housing 45 can be maintained at the desired angle of tilt by inserting a pin (not shown) in the appropriate aperture 144 and into aperture 148.

In operation of the marine propulsion device of the invention, rotation of the lower housing section 16 to steer the boat hull raises the aftward end of the propeller shaft from the generally horizontal position in the normal running position shown in FIG. 1, so that the propeller shaft 28 is inclined at a downwardly and forwardly extending angle with the propeller exerting an upwardly inclined thrust which thus pushes the stern of the boat hull down, thereby raising the bow of the boat hull and preventing the bow from digging into the water on turns.

The use of the forwardly inclined drive shaft housing 12 in accordance with the invention minimizes cavitation above the propeller and provides better protection for the drive unit when docked. This arrangement also facilitates parking and storage.

Various of the features and advantages of the invention are set forth in the following claims.

What is claimed is:

[1. A marine propulsion device comprising a drive shaft housing having first and second parts, a drive shaft rotatably supported in said means for rotatably supporting said drive shaft housing for vertical swinging movement about a horizontal tilt axis located aft of the boat hull and relative to a normal running position in which said drive shaft extends downwardly and forwardly relative to said horizontal tilt axis, and means for rotating said second part of said drive shaft housing about the axis of said drive shaft to afford steering of a boat hull.]

[2. A marine propulsion device in accordance with claim 1, including a propeller shaft rotatably supported in said drive shaft housing and having an axis forming an acute angle with the axis of said drive shaft, said acute angle being measured between the aftward side of said axis of said drive shaft and the upper side of said axis of said propeller shaft.]

[3. A marine propulsion device in accordance with claim 2, wherein said propeller shaft is generally horizontal in said normal operating position of said drive shaft housing.]

[4. A marine propulsion device in accordance with claim 1, wherein said means for rotatably supporting said drive shaft housing for vertical swinging movement about a horizontal tilt axis located aft of the boat hull and relative to a normal running position in which said drive shaft extends downwardly and forwardly relative to said horizontal tilt axis comprises a pair of opposed generally horizontally extending trunnions connected to said boat hull, and apertures in said drive shaft housing which receive said trunnions.]

5. [The device of claim 1, wherein said means for rotating said second part of said drive shaft housing about the axis of said drive shaft to afford steering of a boat hull comprises] *A marine propulsion device comprising a drive shaft housing having first and second parts, a drive shaft rotatably extending in said first and second housing parts, means for rotatably supporting said drive shaft housing for vertical swinging movement about a horizontal tilt axis located aft of the boat hull and relative to a normal running position in which said drive shaft extends downwardly and forwardly relative to said horizontal tilt axis, and means for rotating said second part of said drive shaft housing relative to said housing first part about the axis of said drive shaft to afford steering of a boat hull and comprising* a projecting portion on said second part, said projecting portion extending through and rotatably supported in said first part, a crank, means for mounting said crank on the inboard side of a transom, a transversely extending arm on said projecting portion of said lower housing section, and means drivingly connecting said crank to said arm.

6. The combination of a boat hull and a marine propulsion unit comprising a drive shaft housing, a drive shaft rotatably [suported] *supported* in said drive shaft housing, a propeller shaft rotatably supported in said drive shaft housing, means for drivingly connecting said drive shaft to said propeller shaft, a first shaft, a second shaft, means for supporting said first shaft forwardly of said [transom] *second shaft* for rotation about a generally horizontal axis, means for supporting said second shaft for rotation on its axis aft a said [transom] *first shaft* on a horizontal axis in parallel relation with said first shaft and for selectively adjusting the location of said second shaft relative to said first shaft between positions spaced angularly about said first shaft, means for drivingly connecting said first shaft to said second shaft, means for drivingly connecting said second shaft to said drive shaft, and means on said boat hull for rotatably supporting said drive shaft housing for vertical swinging movement about the axis of said second shaft.

7. The combination of claim 6, wherein said drive shaft and said propeller shaft form an acute angle measured between the aftward side of said drive shaft and the upward side of said propeller shaft.

8. The combination of claim 6, including means on said first shaft for selectively changing the direction of rotation of said first shaft.

[9. A marine propulsion device comprising a drive shaft housing having upper and lower housing sections, a drive shaft rotatably supported in said drive shaft housing, a propeller shaft rotatably supported in said lower housing section, gearing for connecting said drive shaft to said propeller shaft, means for rotatably supporting said drive shaft housing aft of a boat hull for vertical swinging movement about a horizontal tilt axis, means connected to said drive shaft housing for selectively varying the angle of tilt of said drive shaft about said horizontal tilt axis between a range of positions including a normal operating position in which said drive shaft extends downwardly and forwardly relative to said tilt axis and in which said propeller shaft is generally horizontal, and means connected to said lower housing section for rotating said housing section about the axis of said drive shaft to afford steering of the boat hull.]

[10. A marine propulsion device comprising a drive shaft housing, said drive shaft housing having upper and lower housing sections with said lower housing section rotatably connected to said upper housing section, means for rotatably supporting said drive shaft housing for vertical swinging movement about a horizontal tilt axis located aft of the boat hull relative to a normal running position in which said drive shaft housing extends downwardly and forwardly of said horizontal tilt axis, one of said upper housing section and said lower housing section having a projecting portion located on the inside of the other of said upper housing section and said lower housing section, and means connected to said lower housing section for turning said lower housing section for steering a boat hull.]

[11. A marine propulsion device comprising a drive shaft housing having a steerable housing part, a drive shaft rotatably supported in said housing part, a propeller shaft rotatably supported in said housing part, gearing connecting said drive shaft and said propeller shaft, said drive shaft and said propeller shaft forming an acute angle, said acute angle being measured aftward of said drive shaft axis and above said propeller shaft axis.]

12. A marine propulsion device comprising a drive shaft housing having upper and lower housing sections, said upper and lower housing sections having interiors including exhaust passages, said lower housing section being rotatably connected to said upper housing section to afford communication of the exhaust passage of said upper housing section with said exhaust passage in said lower housing section, an exhaust inlet in said upper housing section adapted to be connected to an exhaust conduit extending from an engine fixed to a boat hull and to afford discharge of the exhaust into said exhaust passages of said drive shaft housing, means for rotatably supporting said upper housing section to the boat hull for vertical tilting movement about a horizontal tilt axis, a propeller shaft rotatably supported in said lower housing section, a propeller carried by said propeller shaft, said propeller including a hub with an axial passage and a wall portion in said lower housing section defining an exhaust outlet, said outlet communicating with said exhaust passage in said lower housing section and with said axial passage in said propeller to afford underwater discharge of exhaust gases.

[13. A marine propulsion device comprising a drive shaft housing having first and second parts, said second part being steerable, a drive shaft rotatably supported in said second housing part, a propeller shaft rotatably supported in said second housing part, a propeller on the aftward end of said propeller shaft, gearing connecting said drive shaft and said propeller shaft, said drive shaft and said propeller shaft forming an acute angle with the portion of said propeller shaft between said propeller and said gearing comprising one leg of the acute angle and the drive shaft forming the other leg of the acute angle.]

14. A marine propulsion device comprising a tiltable housing, a first shaft rotatably supported in said tiltable housing, a second shaft rotatably supported in said tiltable housing in spaced parallel relation with said first shaft, with said first shaft being adapted to be located forwardly of a transom and said second shaft being adapted to be located aftward of a transom, means for rotatably supporting said tiltable housing for rotation about the axis of said first shaft, a drive shaft housing, and means for rotatably connecting said drive shaft housing to said tiltable housing for vertical swinging movement about the axis of said second shaft.

15. A marine propulsion device in accordance with claim 14 including means for selectively varying the angle of tilt of said tiltable housing about said first shaft.

References Cited

The following references, cited by the Examiner, are of record in the patented file of this patent or the original patent.

UNITED STATES PATENTS

| | | | |
|---|---|---|---|
| 3,171,382 | 3/1965 | Bergstedt | 115—18 R |
| 3,051,119 | 8/1962 | Hamlyn et al. | 115—35 |
| 3,399,647 | 9/1968 | Alexander et al. | 115—34 R |
| 3,183,880 | 5/1965 | Shimanckas | 115—41 R |
| 3,382,838 | 5/1968 | Bergstedt | 115—41 R |
| 3,489,120 | 1/1970 | Strang | 115—35 |
| 3,310,022 | 3/1967 | Kollman | 115—17 |
| 3,447,504 | 6/1969 | Shimanckas | 115—34 R |
| 3,181,494 | 5/1965 | Kiekhaefer et al. | 115—41 R |

TRYGVE M. BLIX, Primary Examiner

C. E. FRANKFORT, Assistant Examiner

U.S. Cl. X.R.

115—41 R